March 22, 1927. 1,621,857

T. A. SERAPHIN

AUTOMATIC TANK GAUGE

Filed April 7, 1923

WITNESS:

INVENTOR
Theophilus A. Seraphin
BY
Frank S. Busser
ATTORNEY.

Patented Mar. 22, 1927.

1,621,857

UNITED STATES PATENT OFFICE.

THEOPHILUS A. SERAPHIN, OF PHILADELPHIA, PENNSYLVANIA.

AUTOMATIC TANK GAUGE.

Application filed April 7, 1923. Serial No. 630,550.

My invention relates to a gauge adapted for use in measuring the contents of tanks.

Heretofore there has been no practical means for accurately measuring the contents of tanks wherein a liquid under pressure is used to deliver the liquid stored in the tank.

For example, there is in use today for the storage and distribution of motor gasoline a system wherein the gasoline is stored in an underground tank, water under pressure being admitted to force the gasoline through a meter for delivery to the tanks of automobiles. Such a system depends upon the difference in the specific gravity of gasoline and water, the gasoline floating on the water and being delivered by displacement with water. The tank, in use, is always full, there being a zone of gasoline above a zone of water, the relative depth of the zones being dependent upon the amount of gasoline in the tank.

Heretofore there has been no practical way of readily determining the amount of gasoline in the tank to enable a determination of the amount required to replenish the tank with gasoline after a period of distribution.

Now it is the object of my invention to provide a gauge whereby the depths of the zones of gasoline and water may be automatically determined, thereby permitting the amount of gasoline in the tank, or the amount required to replenish the tank, to be readily and accurately computed.

Having now, in a general way, indicated the nature, purpose and advantages of my invention, I will proceed to a detailed description of a preferred embodiment thereof with reference to the accompanying drawings, in which—

Figure 3:
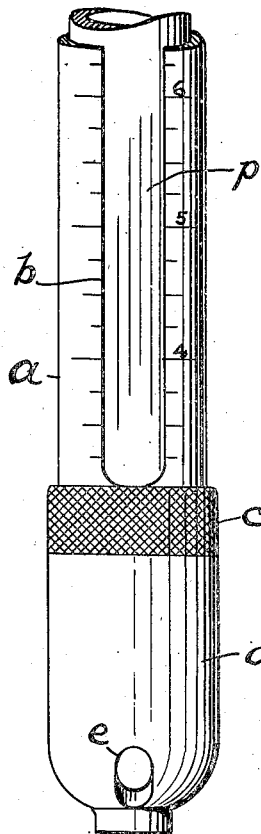
Fig. 3 is an elevation of the lower portion of the gauge.

The gauge comprises a tubular body $a$ provided with a longitudinal opening $b$, adjacent the edges of which are graduations as shown in Fig. 3. The ends of the body are threaded and about it, spaced from the ends, are secured stops $c, c'$.

Threaded on the lower end of the body is a housing $d$, provided with ports $e$, and supporting a valve seat $f$, upon which is adapted to rest a valve $g$ one end of the stem $h$ of which extends through the end of the housing. Within the housing is supported a packing cup $i$ upon which rests packing material $j$, which bears against the lower end of casing $a$, while a spring $k$ is so positioned within the housing that one of its ends bears on the valve $g$ and tends to retain it on the seat $f$. A spider 2, carried by cup $i$, acts as a guide for the upper end of the stem of valve $g$.

Screwed on the upper end of the casing is a housing $l$ provided with ports $m$ and carrying a flanged gland 3 which bears against a packing cup $i'$ in which is packing material $j'$. An internally threaded hole is provided in the upper end of housing $l$ into which is screwed a fitting $n$ to which is secured a handle $o$.

The handle $o$ is hollow and is provided with a vent $v$ affording a passage through the wall of the handle. The handle may be formed from tubing. The interior of the handle is in open communication with the interior of the body of the gauge and serves to permit air displaced from the gauge, on the entry of liquid, to escape, through the vent $v$ or at the end of the handle if the end be left open. The vent $v$ will also serve as a discharge for any liquid discharged by the displaced air and prevent such liquid from being discharged through the end of the handle into the face of one gauging a tank.

A glass tube $p$ is positioned within the casing $a$ and packed and held in position by packing cups $i$ and $i'$.

In practice, the length of the gauge from the lower end of housing $d$ to the ports $m$ in housing $l$ is made at least equal to the maximum depth of liquid in the size tank with which it is to be used.

The gauge is assembled by first screwing the housing $d$, with the valve, spring and packing cup, on the lower end of casing $a$ snug up to the stop $c$. The glass tube $p$ is then inserted in the casing with its lower end resting on packing $j$. Cup $i'$ and packing $j'$ are then inserted in the top of the casing, and housing $l$ containing gland 3 is screwed in place above them and screwed down until packing $j'$ is firmly pressed against the top of tube $p$. The flange of gland 3 rests in a seat in housing $l$ and the tubular portion of said gland bears upon the top of cup $i'$. Thus, when housing $l$ is screwed into place as described, the turning movement under pressure takes place between this relatively thin tubular-end and cup $i'$ and is prevented from being transmitted to the packing, which is allowed to compress against the end of the glass tube without putting the tube under any torsional strain. The use of cup $i'$ eliminates all torsional strain from the glass tube and adds to the life of the tube by eliminating the tendency of the tube to crack under a slight jar, as occurs when the tube is under a torsional strain created by the use of the ordinary packing glands. The handle $o$ is then attached to housing $l$ by screwing fitting $n$ to the housing.

Figure 1:
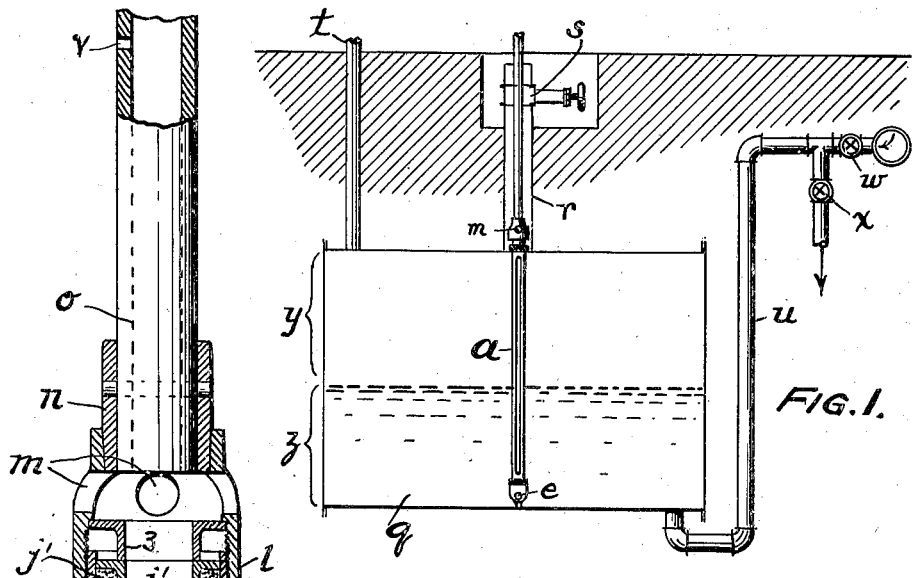
Fig. 1 is a diagrammatic view of a storage tank showing a gauge embodying my invention in use.
Figure 2:
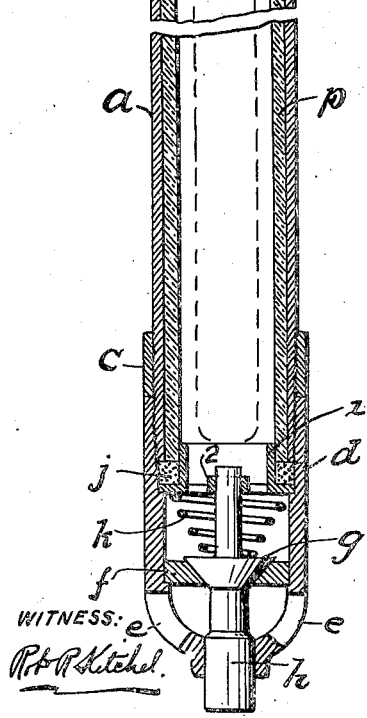
Fig. 2 is a sectional view of a gauge embodying my invention.

Referring now to Figure 1: the tank $q$, buried in the ground, is provided with a filler pipe $r$, valved as at $s$, a delivery pipe $t$, through which gasoline for delivery to a customer passes via a meter, not shown, and a water inlet pipe $u$ valved as at $w$ and provided with a relief valve $x$. The water pipe $u$ is connected to any suitable source of water pressure, as a water main.

If now it be desired to determine the quantity of gasoline in the tank $q$, in which it may be observed by reference to Figure 1 there is a zone of gasoline $y$ and a zone of water $z$, the water valve $w$ is shut off and the relief valve $x$ is opened. The gasoline and water then seek relative levels in the filler pipe $r$ and water pipe $w$ and the valve $s$ may be opened. The gauge is then inserted into the tank through the filler pipe until the valve stem $h$ strikes the bottom of the tank. The weight of the gauge causes valve $g$ to open, the stem moving upwardly against the action of spring $k$ and permitting the end of housing $d$ to rest on the bottom of the tank, water then enters the gauge through ports $e$ $e$ and by valve $g$ into the glass tube $p$ in which it rises to the level of the water in the tank proper.

When the gauge rests on the bottom of the tank, gasoline flows into the tube $p$ through ports $m$ in housing $l$ and stands in the tube above the water to a height equivalent to the height of the zone of gasoline in the tank proper.

By virtue of the hollow handle $o$, air displaced by the entry of the water and of the gasoline is permitted to escape without the necessity of passing through the inlet for gasoline and hence does not interfere with the entry into the gauge of the gasoline.

When the gasoline and water have flowed into the gauge, which takes but a moment, the gauge is drawn out, the spring $k$ acting to close valve $g$ as soon as the gauge is lifted clear of the bottom of the tank, thus preventing the contents of the tube $p$ from running out.

The contents of the tube $p$ are in effect a core from the body of liquids in the tank and on removal from the tank the zones of water and gasoline in the tube are the same as the zones in the tank and their depth may be read through the longitudinal opening $b$ in casing $a$, enabling the amount of gasoline in the tank to be readily determined.

This application is a continuation in part of the application filed by me June 14, 1922, Serial No. 568,107.

Having now fully described my invention, what I claim and desire to protect by Letters Patent is:

1. A gauge for measuring the relative depths of the strata of liquids of different specific gravities in a tank, comprising a hollow body and provided with inlets spaced at different levels and respectively for liquids of different specific gravities whereby, when the gauge is inserted in a tank containing a plurality of liquids of different specific gravities, the liquids of different gravity will enter said body at different points and will assume in the hollow body the same relationship as in the tank.

2. A gauge for measuring the relative depths of the strata of liquids of different specific gravities in a tank, comprising a hollow body and provided with inlets spaced at different levels and respectively for liquids of different specific gravities whereby, when the gauge is inserted in a tank containing a plurality of liquids of different specific gravities, the liquids of different gravity will assume in the hollow body the same relationship as in the tank, and means to prevent the outflow of liquid from said hollow body, means, independent of said inlets, in communication with the atmosphere permitting the escape of air from said body.

3. A gauge for measuring the relative depths of the strata of liquids of different specific gravities in a tank, comprising a hollow body and provided with inlets adjacent opposite ends of the body for the entry of liquids of different gravities whereby, when the gauge is inserted in a tank containing liquids of different specific gravities, the liquids of different gravity will assume in the hollow body the same relationship as in the tank.

4. A gauge for measuring the depths of the strata of liquids of different specific gravities in a tank, comprising a casing, a housing secured to one end of said casing, said housing being ported for the inflow of liquid to said casing, a valve in said housing adapted to prevent the outflow of liquid from said casing, and a housing secured to the other end of said casing, said housing being ported to permit the inflow of liquid to said casing, and a handle secured to said last mentioned housing, said handle being provided with a passage communicating with the interior of the casing and with atmosphere for the escape of air from said casing.

5. A gauge for ascertaining the depths of the strata of liquids of different specific gravities filling a tank, comprising a transparent tube, a casing surrounding said tube, ported housings one secured to each end of said casing, and means to prevent leakage between the housings and the tube, said means consisting of a packing cup and packing bearing upon the end of the tube and a gland seated in the housing and bearing upon the packing cup.

In testimony of which invention, I have hereunto set my hand, at Philadelphia, Pa., this 28th day of March, 1923.

THEOPHILUS A. SERAPHIN.